United States Patent
Ikeda et al.

(10) Patent No.: US 7,456,869 B2
(45) Date of Patent: Nov. 25, 2008

(54) IMAGING DEVICE AND IMAGING DEVICE ADJUSTING METHOD

(75) Inventors: Makoto Ikeda, Kunitachi (JP); Hitoshi Hashimoto, Sagamihara (JP); Masaya Honda, Fuchu (JP)

(73) Assignee: Olympus Corporation, Tokyo (JP)

( * ) Notice: Subject to any disclaimer, the term of this patent is extended or adjusted under 35 U.S.C. 154(b) by 845 days.

(21) Appl. No.: 10/852,290

(22) Filed: May 24, 2004

(65) Prior Publication Data

US 2005/0041119 A1 Feb. 24, 2005

(30) Foreign Application Priority Data

May 27, 2003 (JP) .............................. 2003-149409

(51) Int. Cl.
*H04N 5/235* (2006.01)
(52) U.S. Cl. ................................ 348/229.1; 348/221.1
(58) Field of Classification Search .............. 348/229.1, 348/221.1
See application file for complete search history.

(56) References Cited

U.S. PATENT DOCUMENTS 6,128,036 A * 10/2000 Sakurai et al. ........... 348/222.1
2002/0041332 A1 * 4/2002 Murata et al. ............... 348/272
2003/0231248 A1 * 12/2003 Yuyama et al. .......... 348/229.1
2004/0061796 A1 * 4/2004 Honda et al. ................ 348/297

FOREIGN PATENT DOCUMENTS

JP 9-163239 6/1997

OTHER PUBLICATIONS

Chinese Office Action for Chinese Patent Application No. 2004100429259, mailed on Jan. 6, 2006 (5 pgs.) (with English Translation (8 pgs.)).

* cited by examiner

*Primary Examiner*—Lin Ye
*Assistant Examiner*—Gevell Selby
(74) *Attorney, Agent, or Firm*—John C. Pokotylo; Straub and Pokotylo

(57) ABSTRACT

An imaging device according to one aspect of the present invention has a CCD, a mechanical shutter which prevents transmission of incident light beams to the CCD, a main CPU which sequentially reads stored electric charges obtained by the CCD in a plurality of field cycles and calculates a signal amplification rate based on an image signal which relies on the stored electric charge read to the last field of the plurality of field cycles, and a non-volatile memory which stores the signal amplification rate. The above-described calculation may be executed by an external PC.

10 Claims, 6 Drawing Sheets

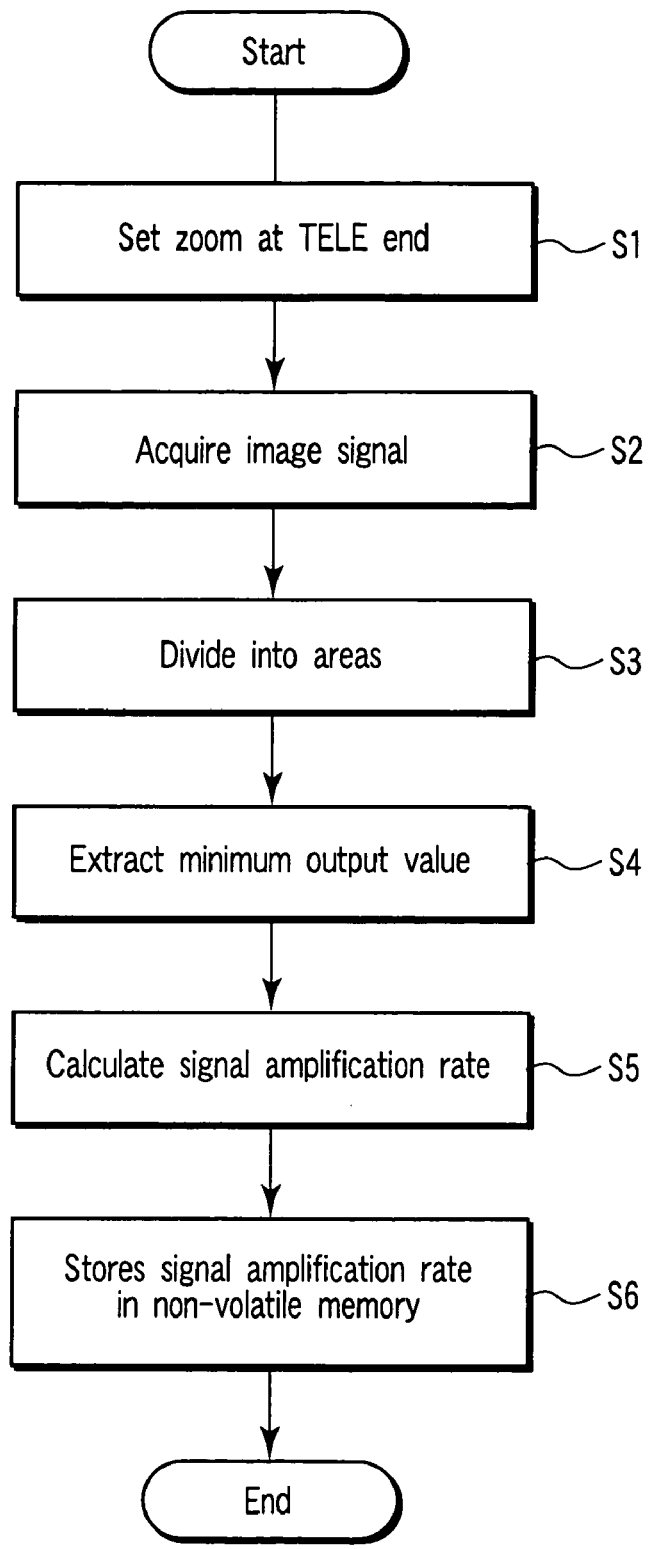
F I G. 9

IMAGING DEVICE AND IMAGING DEVICE ADJUSTING METHOD

CROSS-REFERENCE TO RELATED APPLICATIONS

This application is based upon and claims the benefit of priority from prior Japanese Patent Application No. 2003-149409, filed May 27, 2003, the entire contents of which are incorporated herein by reference.

BACKGROUND OF THE INVENTION

1. Field of the Invention

The present invention relates to a multi-field readout type imaging device and an imaging device adjusting method.

2. Description of the Related Art

In an imaging device such as a digital camera, when photographing a still picture by using an interline transfer type CCD as an imaging element, respective signals of a plurality of fields of the CCD are conventionally read by using a shutter (which will be referred to as a mechanical shutter) which mechanically prevents transmission of light beams entering the imaging element, and the signals for the plurality of fields are combined by a signal processing circuit, thereby obtaining a still picture. Further, in such an imaging device, after an appropriate exposure time is achieved, the mechanical shutter is closed, and a signal electric charge photoelectrically converted by lowering a reverse bias voltage (which will be referred to as an SUB voltage hereinafter) applied between an n-type substrate constituting the CCD and a p-type diffusion area formed on the surface of the n-type substrate is suppressed from being discharged to the substrate side.

BRIEF SUMMARY OF THE INVENTION

The present invention suppresses a difference in brightness between respective fields by enabling all the fields to assuredly reach a saturation level when reading the plurality of fields.

As one aspect of the present invention, there is provided an imaging device comprising: an imaging element having a storage section which stores an electric charge generated by incident light beams; a light shielding section which prevents transmission of the incident light beams to the imaging element; a reading section which sequentially reads stored electric charges obtained by the imaging element as image signals in a plurality of field cycles while transmission of the light beams is prevented by the light shielding section; and a storage section which stores a signal amplification rate calculated from an output of an image signal based on the stored electric charge read to a last field in the order of reading of the plurality of field cycles among the sequentially read image signals.

Advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 9 is a flowchart showing a flow of processing of a signal amplification rate calculation by the imaging device according to the third embodiment.

DETAILED DESCRIPTION OF THE INVENTION

First Embodiment

Figure 1:
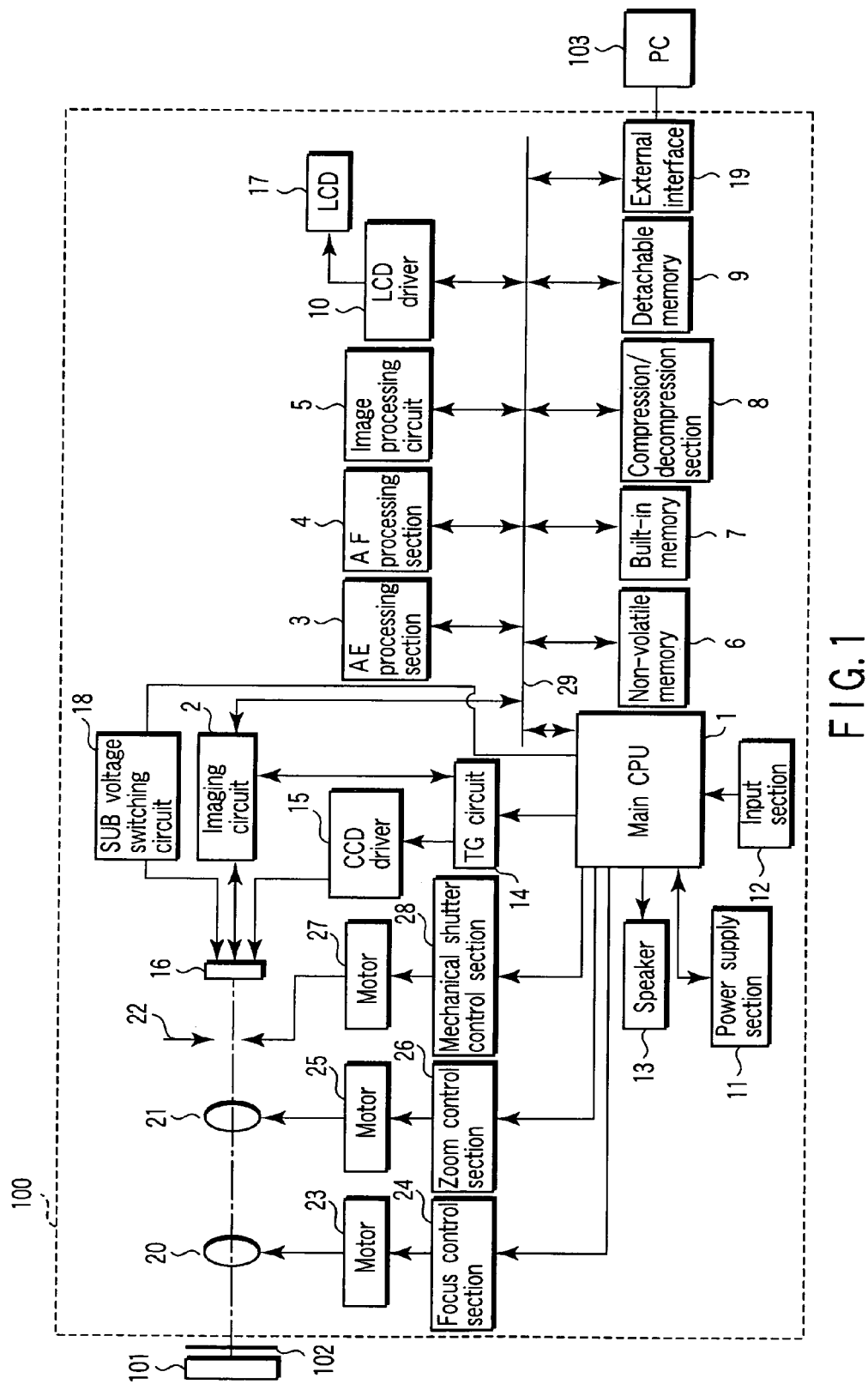
FIG. 1 is a view showing a structural example of an imaging device or the like according to a first embodiment.

FIG. 1 shows a structural example of an imaging device according to a first embodiment of the present invention and its peripheral devices, and a description will be given as to these devices. It is to be noted that an example of application to a digital camera will be explained as an example of the imaging device here, but the present invention is not restricted thereto.

As shown in FIG. 1, in this digital camera 100, a focus lens 20, a zoom lens 21 and a mechanical shutter 22 are provided in a light path of light beams from a viewer 101 which is used as a light source. A CCD 16 as an imaging element is arranged at an image formation position of a light image obtained through these members 20, 21 and 22. To a main CPU 1 which executes a control over the entire digital camera 100 are electrically connected an AE (automatic exposure) processing section 3 which performs an AE calculation in photography, an AF (automatic focusing) processing section 4 which performs an AF calculation in photography, an image processing circuit 5 which performs image processing, a liquid crystal display (LCD) driver 10, a non-volatile memory 6, a built-in memory 7, a compression/decompression section 8, a detachable memory 9 and an external interface (I/F) 19 through a bus 29.

Further, to this main CPU 1 are also electrically connected a focus control section 24 which drives and controls a motor 23, a zoom control section 26 which drives and controls a motor 25, a mechanical shutter control section 28 which drives and controls a motor 27, a timing generator (TG) circuit 14, a speaker 13, a power supply section 11, an input section 12 and others. A power is supplied to each section in this digital camera 100 by the power supply section 11. It is to be noted that the motor 23 is used to move the focus lens 20, the motor 25 is used to move the zoom lens 21 and the motor 27 is used to drive the mechanical shutter 22. Furthermore, the input section 12 includes various menu buttons, a release switch, various mode switches and any other operation switches.

Moreover, the digital camera 100 can be connected with an external personal computer (which will be abbreviated as a PC hereinafter) 103 through the external I/F 19.

In the above-described structure, when an electric charge for each pixel is stored by the CCD 16 during its exposure time and an image signal based on the stored electric charge is output while transmission of light beams is prevented by the mechanical shutter 22 upon terminal of the storage, processing which will be described later in detail is applied to this output by an imaging circuit 2 on a rear stage, and it is temporarily stored in the built-in memory 7 as an image signal.

This image signal is subjected to various kinds of image processing by the image processing circuit 5, converted into an analog signal, then output to the LCD 17 which is driven and controlled by the LCD driver 10, and displayed in a monitor. The image signal stored in the built-in memory 7 is read to the compression/decompression section 8. Then, a data quantity is compressed by a predetermined compression method such as JPEG (Joint Photograph Experts Group). Thereafter, it is recorded and saved in the detachable memory 9 constituted of, e.g., a flash memory.

Additionally, the image signal saved in this detachable memory 9 is read to and decompressed by the compression/decompression section 8 in a reproducing mode. Then, it is temporarily stored in the built-in memory 7. Thereafter, the image signal is subjected to various kinds of image processing equal to those described in conjunction with the image processing circuit 5, converted into an analog signal, and displayed in the monitor by the LCD 17.

The TG circuit 14 generates various kinds of timing signals based on a control of the main CPU 1 in each step of the above-described operation. Then, it supplies the timing signal to the imaging circuit 2 on the rear stage and the CCD driver 15 which drives the CCD 16.

Further, the AE processing section 3 automatically adjusts the exposure based on the image signal. More specifically, the AE processing section 3 integrates the image signals and supplies the integration value to the main CPU 1. The main CPU 1 variably controls an electric charge storage time in the CCD 16 by driving and controlling the CCD driver 15, and automatically adjusts the exposure.

The AF processing section 4 automatically adjusts a focusing position based on the image signal. More specifically, the AF processing section 4 extracts a high-frequency component and obtains an AF evaluation value by integrating digital image signals through a non-illustrated high-pass filter. The main CPU 1 controls to set the focus lens 20 at a position where the AF evaluation value becomes maximum. A SUB voltage switching circuit 18 suppresses a signal electric charge photoelectrically converted by lowering a SUB voltage applied to the CCD 16 from being discharged to the substrate side.

It is to be noted that the imaging element described in claims corresponds to, e.g., the CCD 16, light shielding means corresponds to, e.g., the mechanical shutter 22, reading means corresponds to, e.g., the main CPU 1, and storing means corresponds to, e.g., the non-volatile memory 6. Furthermore, arithmetic operation performing means corresponds to, e.g., the main CPU 1, the external PC 103 or the like. It is needless to say that the present invention is not restricted to this relationship.

Although the above has described the basic effect as the digital camera 100, a characteristic adjustment step (determination of a signal amplification rate) will be explained later.

Figure 2:
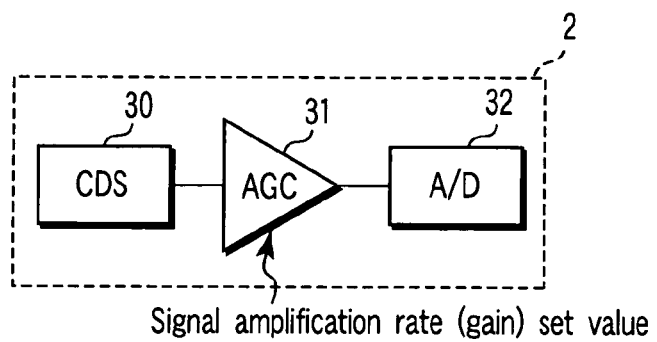
FIG. 2 is a view showing a detailed structure of an imaging circuit 2 in FIG. 1.

Here, the detailed structure of the imaging circuit 2 is as shown in FIG. 2.

That is, as shown in FIG. 2, the imaging circuit 2 comprises a CDS circuit 30, an AGC circuit 31 and an analog-to-digital conversion circuit 32. The CDS circuit 30 samples and holds a reset level and a signal level of a CCD output with a predetermined timing, and eliminates a low-frequency noise component which exists in the CCD output by taking out a difference between the signal levels by a subtraction, thereby alleviating the noise. The AGC circuit 31 amplifies (gain-controls) an output from this CDS circuit 30 at a predetermined signal amplification rate, and outputs a result. Moreover, the analog-to-digital conversion circuit 32 converts an output signal from the AGC circuit 31 into a digital signal, and outputs it to the bus 29.

In this first embodiment, although the detail will be described later, a signal amplification rate of the AGC circuit 31 is obtained based on the output level of the image signal of the signal electric charge read to the last filed, thereby assuredly reaching a saturation level in accordance with each field. That is, the main CPU 1 calculates an amplification rate of the image signal of each filed cycle based on the image signal read to the last field, and transmits the calculated amplification rate of the image signal to the non-volatile memory 6 or the like.

This will be described later.

Figure 3:
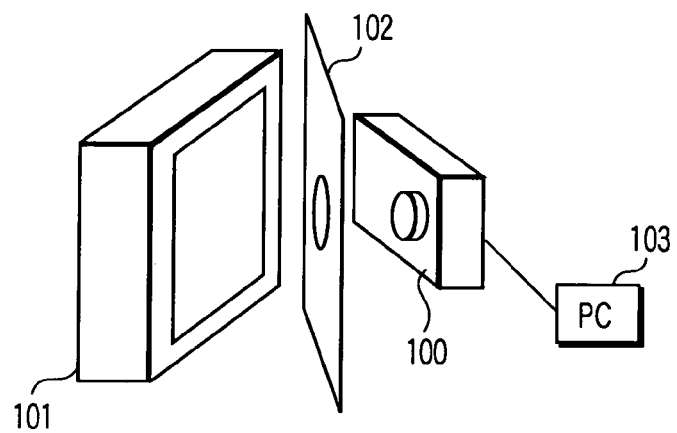
FIG. 3 is a view showing an adjustment operation of the imaging device according to the first embodiment.

It is to be noted that how the actual adjustment operation is carried out by the imaging device according to the first embodiment is shown in, e.g., FIG. 3. That is, light beams from the viewer 101 as a light source having a fixed brightness are partially blocked by a transfer prevention plate 102 while entering the digital camera 100. Additionally, the above-described various kinds of processing are carried out in the digital camera 100.

In this first embodiment, although the detail will be described later, the signal amplification rate of the AGC circuit 31 can be likewise calculated by the PC 103 which is an external arithmetic operation device connected with the digital camera 100.

Figure 4:
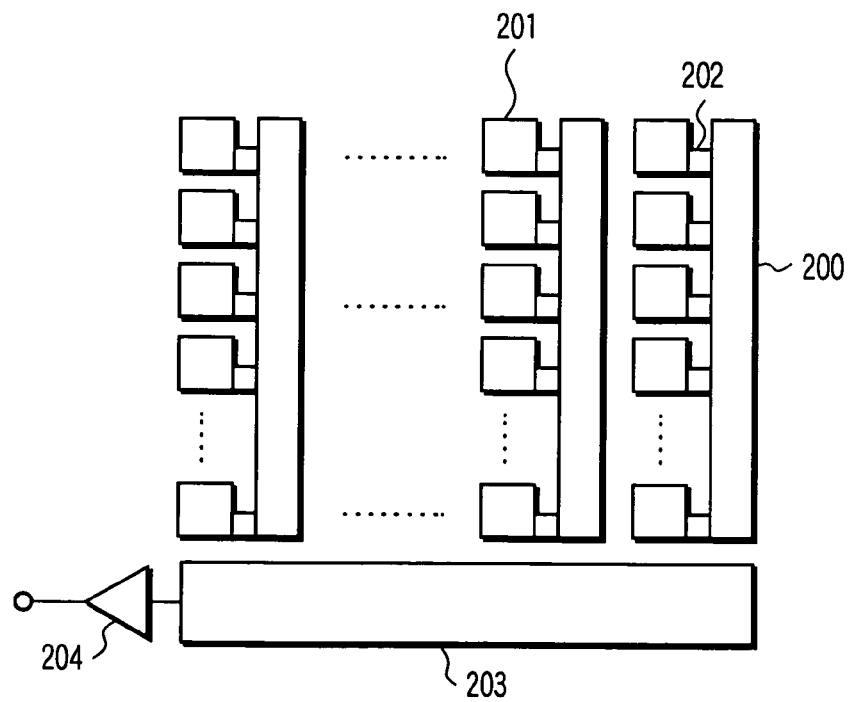
FIG. 4 is a view showing a structural example of a CCD 16 in FIG. 1.

Meanwhile, the CCD adopted in the first embodiment is an interline type CCD having a vertical overflow drain structure, and its structure is shown in FIG. 4.

That is, as shown in FIG. 4, this CCD has vertical shift registers 200 in a plurality of columns, a plurality of photodiodes 201 adjacent to each other in a matrix form, transfer gates 202 each of which reads a signal electric charge stored in the photodiode 201 to the vertical shift register 200, a horizontal shift register 203 provided at one end of each vertical shift register 200 in the lateral direction, and a signal detector 204 which is provided at one end of the horizontal shift register 203 and detects a signal electric charge.

This first embodiment adopts a three-field reading mode.

The three-field reading operation performed by the imaging device according to the first embodiment will now be described with reference to FIGS. 5A, 5B and 5C. It is to be noted that each of Gb, Gr, R and B in FIGS. 5A, 5B and 5C means color filter arrangement of each pixel, and an electric charge with respect to light beams whose wavelength is selected by each color filter is stored.

Figure 10:
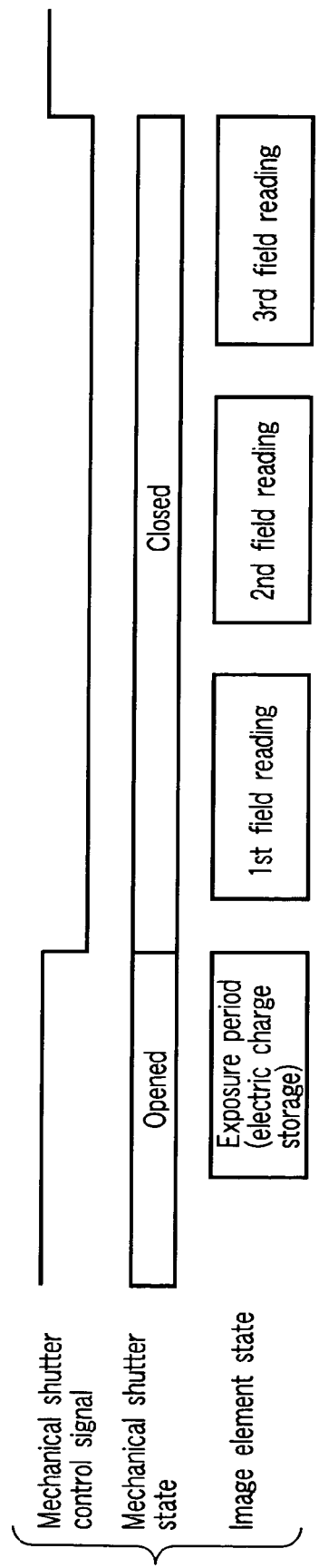
FIG. 10 is a time chart of a mechanical shutter and reading.

At this time, as shown in FIG. 10, the mechanical shutter 22 is in an opened state by a mechanical control signal from the mechanical shutter control section 28 in an exposure period of the imaging element 16, i.e., during storage of the electric charge. Further, when storage of the electric charge is terminated, a signal which is used to close the mechanical shutter 22 is output from the mechanical shutter control section 28. Then, an image signal based on the stored electric charge is output by reading of each of first to third fields in a state that the mechanical shutter 22 is closed.

Figure 5:
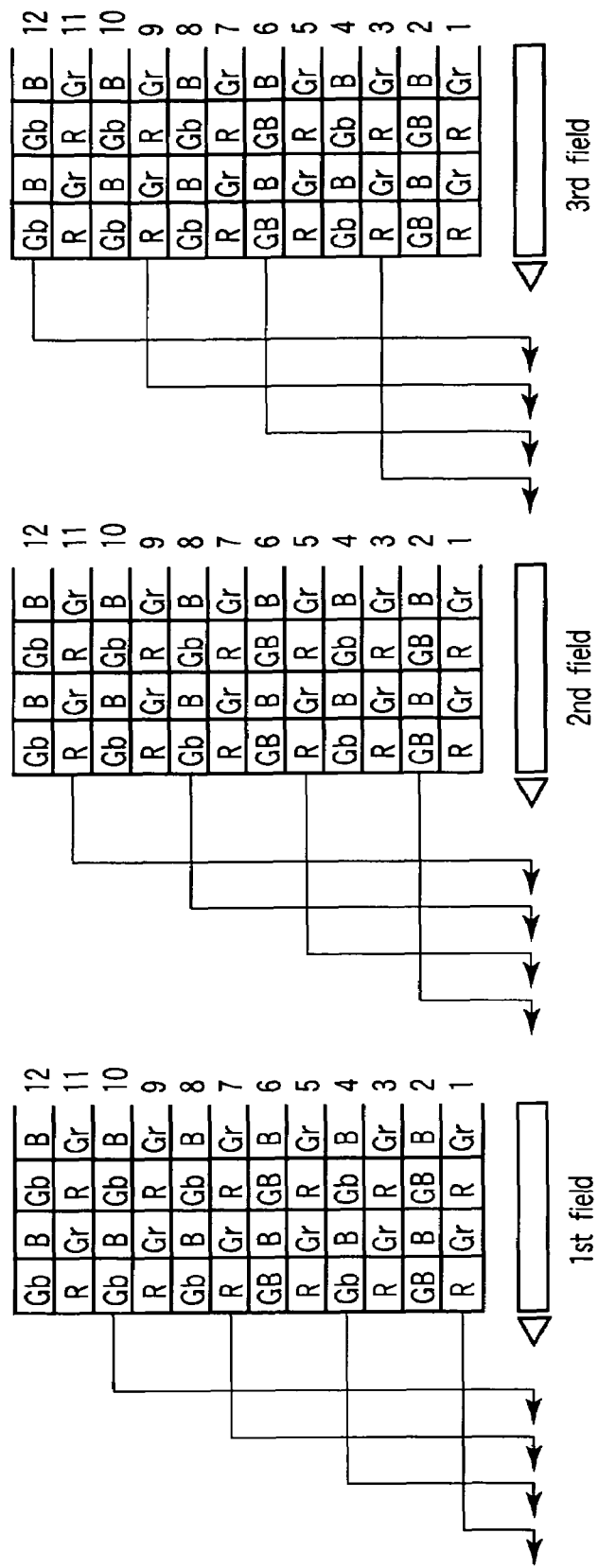
FIGS. 5A, 5B and 5C are views illustrating reading of three fields.

First, as shown in FIG. 5A, electric charges in a first horizontal pixel column, a fourth horizontal pixel column, a seventh horizontal pixel column and a 10th horizontal pixel column are read to the vertical shift registers 200 by supply of a read pulse. Output of these electric charges becomes the first filed of the CCD output. Then, as shown in FIG. 5B, electric charges in a second horizontal pixel column, a fifth horizontal pixel column, an eighth horizontal pixel column and an 11th horizontal pixel column are read to the vertical shift registers 200 by supply of the read pulse. Output of these electric charges becomes a second field of the CCD output. Furthermore, as shown in FIG. 5C, electric charges in a third horizontal pixel column, a sixth horizontal pixel column, a ninth horizontal pixel column and a 12th horizontal pixel column are read to the vertical shift registers 200 by the read pulse. Output of these electric changes becomes the third field of the CCD output. All the pixel signals can be read in the order of reading of such first to third fields.

Figure 6:
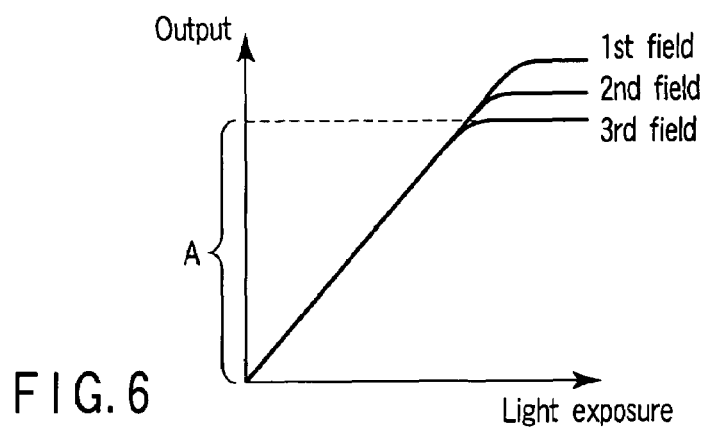
FIG. 6 is a characteristic view showing output level differences between respective fields generated in three-field reading by the imaging device according to the first embodiment.

As described above, although the three-field reading mode is adopted in the imaging device according to the first embodiment, such differences as shown in a characteristic view of FIG. 6 can be produced in output levels of the respective first to third fields. It is to be noted that a vertical axis represents a CCD output and a horizontal axis represents a light exposure in FIG. 6. Therefore, when a signal amplification rate of the AGC circuit 31 is determined based on the image signal which relies on the stored electric charge read to the first field, there occurs a situation that a saturation level is not definitely reached in all fields.

As described above, in case of reading a plurality of fields, when an object with a high brightness is a subject, it takes time until a signal of the last field is read as the number of fields is increased. Therefore, the electric charges stored nearly to the saturation state get over a potential barrier which is determined by a substrate (SUB) voltage with time and are gradually discharged to the substrate side, and differences in brightness are produced between the respective fields. In particular, when reading three or more fields, there are generated positions at which differences in output between adjacent fields become large. Therefore, output differences are apt to be visually confirmed as a stripe pattern as compared with a case of reading of two fields. That is, in case of reading of a plurality of fields, the control based on the SUB voltage alone is insufficient. Moreover, when reading a plurality of fields, the output signal level becomes small as described above when reading of each field advances. Therefore, a signal amplification rate is calculated based on the output of the first field when performing saturation adjustment, i.e., adjustment of the signal amplification rate based on the saturation output of the imaging element. Then, when a saturation level is determined, the output of the last field does not reach the saturation level, and its influence remarkably appears as a stripe pattern on a photographed image, which becomes a problem.

Paying attention to such a point, in the imaging device according to the first embodiment of the present invention, a signal amplification rate of the AGC circuit 31 is determined based on the image signal which relies on the stored electric charge read to the last field (third field in the example of FIG. 6), and the saturation adjustment is carried out (signal amplification rate is determined based on "A" in the example of FIG. 6).

More specifically, light beams from the viewer 101 as a light source having a fixed brightness enter the digital camera 100 while being partially blocked by the transfer prevention plate 102, and are imaged by the CCD 16. Then, under control of the main CPU 1, the stored electric charges obtained by the CCD 16 are sequentially read in a plurality of field cycles.

In the example of FIG. 6, the stored electric charges are sequentially read in cycles of the first to third fields. Additionally, a signal amplification rate of the AGC circuit 31 is calculated based on the image signal which relies on the stored electric charge read to the last field (third field in this example) in the plurality of field cycles. Further, this signal amplification rate is stored in the non-volatile memory 6, and the saturation adjustment of the image signal output is carried out based on this amplification rate. For example, assuming that A in FIG. 6 is an average value of the image signals read to the third field and Vd is a voltage representing a dynamic range at the time of analog-to-digital conversion, the output can be adjusted to be assuredly saturated by determining the signal amplification rate as 20×log (Vd/A). It is to be noted that A is not restricted to the average value and it may be obtained from a minimum value of the outputs.

As described above, according to the first embodiment of the present invention, in reading of a plurality of fields, a signal amplification rate is set based on the output level of the last field and the saturation adjustment is carried out when an object with a high brightness is a subject. As a result, it is possible to provide the imaging device which can suppress differences in brightness between fields. That is, in the first embodiment, adjustment is carried out in such a manner that the last field having the lowest level can reach the saturation. Therefore, the fields which are read before the last field can also reach the saturation level, and there can be demonstrated an effect that the output differences do not appear as stripes on a photographed image.

Second Embodiment

A second embodiment of the present invention is characterized in that a signal amplification rate is set based on an output of an image signal which relies on a stored electric charge of a color having a minimum output level in a last field.

Incidentally, since a structure of an imaging device according to the second embodiment is the same as the structure (FIG. 1) of the imaging device according to the first embodiment mentioned above, the tautological explanation is eliminated here, and like reference numerals denote like constituent elements in order to advance the description.

In general, although there is a color temperature (K: Kelvin) as an index representing a color of a light source, it is determined that a color temperature of reddish light beams is approximately 2000 K, a color temperature of white light beams is 5000 K and a color temperature of bluish light beams is approximately 10000 K. When photography is performed in an environment where the color temperature differs, an output level of the image signal based on the electric charge stored in each pixel also varies because of a relationship between a color (RGB) of a color filter of each pixel and a color temperature.

Figure 7:
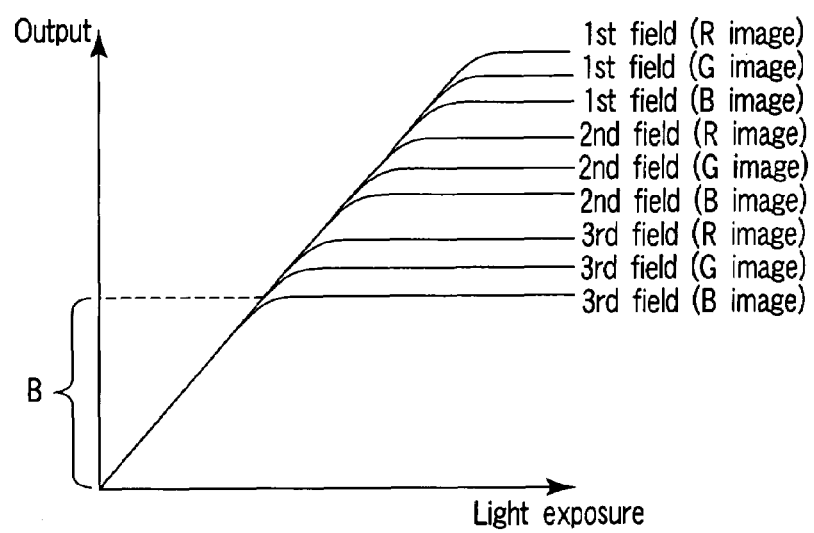
FIG. 7 is a characteristic view showing an output level differences between respective fields for each filter color generated in three-field reading by an imaging device according to a second embodiment.

For example, FIG. 7 shows an output level of each pixel which is obtained by performing photography at a color temperature of, e.g., 2800 K. It is to be noted that a vertical axis represents an output and a horizontal axis represents a light exposure.

In the example of FIG. 7, it can be understood that an output of a light receiving signal of a pixel (B pixel) having a blue filter of a last field arranged thereto is minimum.

Although not shown, it was revealed from an experiment that an output of an image signal based on a stored electric charge of a pixel (R pixel) having a red filter of the last field arranged thereto is minimum when photography is carried out at a color temperature of 7000 K.

Paying attention to such a point, in the second embodiment, the image signal based on the stored electric charge read to the last field (third field in the example of FIG. 7) is processed in accordance with each color. Furthermore, a signal amplification rate of the AGC circuit 31 included in the imaging circuit 2 of the digital camera 100 is determined based on an output signal of the pixel of a color whose output level is minimum, and saturation adjustment is carried out (signal amplification rate is determined based on "B" in the example of FIG. 7).

More specifically, light beams from the viewer 101 as a light source having a fixed brightness enter the digital camera 100 while being partially blocked by the transfer prevention plate 102, and are imaged by the CCD 16. Then, under control of the main CPU 1, the stored electric charges obtained by the CCD 16 are sequentially read in a plurality of field cycles.

In the example of FIG. 7, image signals based on stored electric charges of respective pixels are sequentially read in the plurality of field cycles. Then, the image signal based on the stored electric charge read to the last field in the plurality of field cycles is processed in accordance with each color by the main CPU 1 or the external PC 103. Moreover, a signal amplification rate of the AGC circuit 31 is calculated based on an output of the image signal which relies on the stored electric charge of the pixel ("B pixel" in the third field in the example of FIG. 7) of a color whose output is minimum, this signal amplification rate is stored in the non-volatile memory 6, and saturation adjustment is carried out. For example, assuming that B in FIG. 7 is an average value of outputs of the image signals read to the last field for a color whose output is minimum and Vd is a voltage representing a dynamic range at the time of analog-to-digital conversion, the output can be adjusted to be assuredly saturated by determining the signal amplification rate as 20×log (Vd/B). It is to be noted that B is not restricted to the average value, and it may be obtained from a minimum value of outputs of the image signal for a color whose output is minimum.

As described above, according to the second embodiment, it is possible to provide an imaging device which can suppress irregularities in each color by calculating a signal amplification rate preferable for each color temperature based on a result of photography while changing a color temperature, and executing the saturation adjustment.

Third Embodiment

A third embodiment of the present invention is characterized in that a read image of a last field is further divided into areas and a signal amplification rate is set based on a corresponding image signal of an area where an output level is minimum among image signals of the respective areas.

Incidentally, since a structure of an imaging device according to the third embodiment is the same as the structure (FIG. 1) of the imaging device according to the first embodiment mentioned above, the tauto-logical explanation is eliminated here, and like reference numerals denote like constituent elements in order to advance the description.

A flow of a calculation of a signal amplification rate carried out by the imaging device according to the third embodiment will now be described in detail hereinafter with reference to flowcharts of FIGS. 8 and 9.

First, a zoom lens 21 is set at a maximum variable power position (TELE end) (step S1). That is because the homogeneity cannot be achieved due to a decrease in light beams around the zoom lens 21 when the lens 21 is placed at a WIDE end. Then, light beams from the viewer 101 enter the digital camera 100 while being partially blocked by the transfer prevention plate 102, and are imaged by the CCD 16. Moreover, under control of the main CPU 1, the stored electric charges obtained by the CCD 16 are sequentially read in a plurality of field cycles. The thus obtained read image of the last field is shown in FIG. 8 (step S2).

When outputting an image signal based on the stored electric charge with respect to the light beams received by the CCD 16 as an imaging element through the zoom lens 21 which can vary a power in this manner, photography is carried out at a position where this zoom lens 21 has a maximum variable magnifying power (at the time of acquiring an adjustment value).

Figure 8:
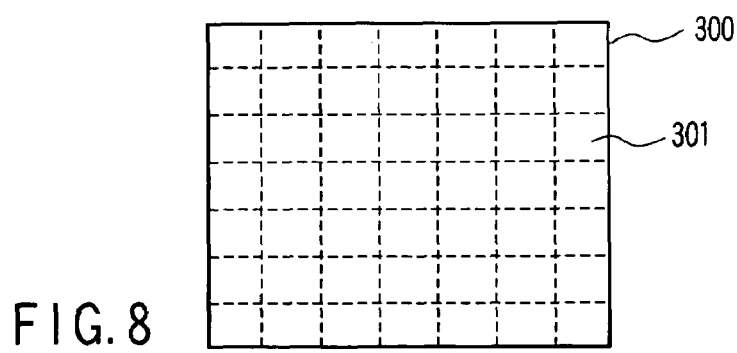
FIG. 8 is a view showing an image area division example by an imaging device according to a third embodiment.

Then, the main CPU 1 divides a read image 300 of the last field into predetermined areas as shown in FIG. 8 (step S3), and calculates a minimum output value (step S4). In detail, in this calculation, an image signal of a minimum area among image signals of a plurality of divided areas 301 may be extracted as the minimum output value, or an average value of the image signals of the respective areas may be calculated in order to determine the average value as the minimum output value. Moreover, assuming that Voi is the obtained minimum output value and Vd is a voltage representing a dynamic range at the time of analog-to-digital conversion, the output can be adjusted to be assuredly saturated by determining the signal amplification rate as 20×log (Vd/Voi).

The main CPU 1 calculates a signal amplification rate of the AGC circuit 31 based on the minimum output value (step S5), stores the signal amplification rate in the non-volatile memory 6 (step S6), and terminates the processing. It is to be noted that the example in which the signal amplification rate is calculated by the main CPU 1 has been described, but the signal amplification rate may be calculated by the external PC 103.

As described above, according to the third embodiment, even if high pixels and multiple fields are formed, by dividing the read image of the last field into areas, calculating a signal amplification rate based on the image signal of an area where the image signal is minimum and performing the saturation adjustment, differences in brightness between the fields can be suppressed by the simple calculation, and the imaging device which can obtain an image which is not affected by stripes can be provided.

Although the above has described the embodiments according to the present invention, the present invention is not restricted to the content mentioned above, and it is needless to say that various kinds of modifications/changes can be carried out without departing from the scope of the invention. For example, although the digital camera is taken as an example and described in the foregoing embodiments, the present invention is not restricted thereto, and it can be of course applied to a PDA including an imaging function, a mobile phone and others, and various kinds of mobile devices.

Moreover, when adopting the CCD having an optical black (which will be abbreviated as OB hereinafter) in which some pixels are light-shielded, OB values may be read from an OB area, an average value of the OB values is calculated in accordance with each color, the average value of the OB values for each color may be subtracted from an average value of image signals obtained from normal pixels for each color, a minimum value may be extracted, and a signal amplification rate may be calculated based on the minimum value.

The foregoing embodiments include inventions on various stages, and variety of inventions can be extracted by appropriate combinations of a plurality of disclosed constituent elements and combinations of a plurality of embodiments. For example, if the above-described problems can be solved and the later-described effects of the invention can be obtained even though some constituent requirements are eliminated from all constituent requirements disclosed in the embodiments, the structure after eliminating such requirements can be achieved as an invention.

As described above, according to each of the foregoing embodiments of the present invention, it is possible to provide the imaging device which enables all fields to assuredly reach a saturation level and can suppress differences in brightness between the fields by setting a signal amplification rate based on an output concerning a field having a lowest output level, determining the saturation level and performing saturation adjustment when reading a plurality of fields.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An imaging device comprising:
   imaging means having a storage section which stores an electric charge generated by incident light beams;
   light shielding means for preventing transmission of the incident light beams to the imaging means;
   reading means for sequentially reading stored electric charges obtained by the imaging means as imaging signals in a plurality of field cycles while transmission of the incident light beams is prevented by the light shielding means; and
   storing means for storing a signal amplification rate of an image signal of each field cycle calculated with reference to an image signal read to the last field in the order of reading of the plurality of field cycles among the sequentially read image signals.

2. The imaging device according to claim 1, further comprising:
   controlling means for controlling an amplification rate of the read image signal of each field cycle by using the stored signal amplification rate.

3. The imaging device according to claim 2, wherein the imaging means have color selecting means for outputting the incident light beams in accordance with each color, can output the image signal based on the stored electric charge for each color in each field in the plurality of field cycles, processes the image signals based on the stored electric charges read to the last field in the plurality of field cycles in accordance with respective colors, and calculates the signal amplification rate which is stored in the storing means based on the image signal of a color having a minimum output among processed image signals.

4. The imaging device according to claim 1, further comprising:
   arithmetic operation performing means for obtaining an image signal of each area, the image signal read to the last field being divided into predetermined areas, wherein the signal amplification rate is calculated by the arithmetic operation performing means from the image signal in an area having a minimum output among the image signals of the respective areas.

5. The imaging device according to claim 1, further comprising:
   arithmetic operation performing means for obtaining an image signal of each area, the image signal read to the last field being divided into predetermined areas, wherein the signal amplification rate is calculated by the arithmetic operation performing means from an average value of the image signals of the respective obtained areas.

6. The imaging device according to claim 1, wherein, when outputting the image signal based on the stored electric charge with respect to the light beams received by the imaging means through a taking lens capable of varying a power, photography is carried out with the taking lens being set at a position where a maximum variable magnifying power can be obtained.

7. An imaging adjusting method comprising:
   storing an electric charge generated by incident light beams in a storage section of an imaging section;
   preventing transmission of the incident light beams to the imaging means by a light shielding section;
   sequentially reading the stored electric charges obtained by the imaging section as image signals in a plurality of field cycles by reading means while transmission of the incident light beams is prevented by the light shielding section; and
   storing a signal amplification rate of an image signal of each field cycle calculated with reference to an image signal read to the last field in the order of reading of the plurality of field cycles among the sequentially read image signals.

8. The imaging device adjusting method according to claim 7, further comprising:
   using a control section in order to control an amplification rate of each of the read image signals of the field cycles by using the stored signal amplification rate.

9. An imaging device comprising:
   an imaging element having a storage section which stores an electric charge generated by incident light beams;
   a light shielding section which prevents transmission of the incident light beams to the imaging element;
   a reading section which sequentially reads the stored electric charges obtained by the imaging element as imaging signals in a plurality of field cycles while transmission of the incident light beams is prevented by the light shielding section; and
   a storing section which stores a signal amplification rate of an image signal of each field cycle calculated with reference to an image signal read to the last field in the order of reading of the plurality of field cycles among the sequentially read image signals.

10. The imaging device according to claim 9, further comprising:
    a control section which controls an amplification rate of each of the read image signals of the field cycles by using the stored signal amplification rate.

* * * * *